United States Patent
Durand

(10) Patent No.: US 8,325,729 B2
(45) Date of Patent: Dec. 4, 2012

(54) METHODS AND A DEVICE FOR SECURE DISTANCE CALCULATION IN COMMUNICATION NETWORKS

(75) Inventor: Alain Durand, Rennes (FR)

(73) Assignee: Thomson Licensing, Boulogne-Billancourt (FR)

( * ) Notice: Subject to any disclaimer, the term of this patent is extended or adjusted under 35 U.S.C. 154(b) by 434 days.

(21) Appl. No.: 11/998,215

(22) Filed: Nov. 29, 2007

(65) Prior Publication Data

US 2008/0181126 A1  Jul. 31, 2008

(30) Foreign Application Priority Data

Nov. 29, 2006  (EP) ..................................... 06301192

(51) Int. Cl.
*H04L 12/28* (2006.01)
(52) U.S. Cl. ......... 370/392; 370/389; 370/390; 370/252
(58) Field of Classification Search .................. 370/252, 370/231, 389, 390, 392, 248, 395.42
See application file for complete search history.

(56) References Cited

U.S. PATENT DOCUMENTS

| | | | | |
|---|---|---|---|---|
| 6,192,404 B1 * | 2/2001 | Hurst et al. | | 709/224 |
| 6,501,756 B1 * | 12/2002 | Katsube et al. | | 370/392 |
| 6,507,562 B1 * | 1/2003 | Kadansky et al. | | 370/390 |
| 6,760,309 B1 * | 7/2004 | Rochberger et al. | | 370/235 |
| 6,958,998 B2 * | 10/2005 | Shorey | | 370/395.42 |
| 6,985,591 B2 * | 1/2006 | Graunke | | 380/277 |
| 7,013,342 B2 * | 3/2006 | Riddle | | 709/230 |
| 7,188,224 B2 * | 3/2007 | Ohta et al. | | 711/163 |
| 7,200,673 B1 * | 4/2007 | Augart | | 709/238 |
| 7,558,265 B2 * | 7/2009 | Andre et al. | | 370/392 |
| 7,599,303 B2 * | 10/2009 | Nadeau et al. | | 370/248 |
| 7,633,879 B2 * | 12/2009 | Ramalho | | 370/252 |
| 7,813,348 B1 * | 10/2010 | Gupta et al. | | 370/394 |
| 7,873,731 B1 * | 1/2011 | Leavy et al. | | 709/225 |
| 2003/0110274 A1 | 6/2003 | Pazi et al. | | |
| 2003/0110276 A1 | 6/2003 | Riddle | | |

(Continued)

FOREIGN PATENT DOCUMENTS

EP  1 482 682 A1  12/2004

(Continued)

OTHER PUBLICATIONS

Search Report Jun. 15, 2007.

*Primary Examiner* — Ricky Ngo
*Assistant Examiner* — DeWanda Samuel
(74) *Attorney, Agent, or Firm* — Tutunjian & Bitetto, P.C.

(57) ABSTRACT

Device and method for calculating distance in a communication network. Device A sets a non-predictable initial Time-To-Live (TTL) value and sends a message with this value to device B. B reads the TTL of the received message. A and B establish a Secure Authenticated Channel over which B sends the TTL of the received message. A may then calculate the distance to B. If the received TTL is greater than the initial TTL, this indicates an error or an attack; if the received TTL is lower than the initial TTL minus a TTL limit, then B is too distant; and if the initial TTL minus the TTL limit is less than or equal to the received TTL, which in turn is less than or equal to the initial TTL, then A may conclude that B a priori is within the required distance.

25 Claims, 5 Drawing Sheets

U.S. PATENT DOCUMENTS

| | | | |
|---|---|---|---|
| 2004/0109449 A1* | 6/2004 | Seo et al. | 370/390 |
| 2004/0160941 A1 | 8/2004 | Suh et al. | |
| 2004/0230800 A1* | 11/2004 | Futa et al. | 713/169 |
| 2005/0180421 A1* | 8/2005 | Shimada et al. | 370/389 |
| 2005/0232227 A1* | 10/2005 | Jorgenson et al. | 370/351 |
| 2005/0251603 A1* | 11/2005 | Ishii et al. | 710/110 |
| 2006/0230134 A1* | 10/2006 | Qian et al. | 709/224 |
| 2007/0022195 A1* | 1/2007 | Kawano et al. | 709/225 |

FOREIGN PATENT DOCUMENTS

| | | |
|---|---|---|
| WO | WO 02/03653 A2 | 1/2002 |
| WO | WO 03/079638 A1 | 9/2003 |
| WO | WO 2004/014037 * | 2/2004 |

* cited by examiner

METHODS AND A DEVICE FOR SECURE DISTANCE CALCULATION IN COMMUNICATION NETWORKS

This application claims the benefit, under 35 U.S.C. §119, of European Patent Application No. 06301192.8 filed Nov. 29, 2006.

FIELD OF THE INVENTION

The present invention relates generally to communication networks, and in particular to the secure distance calculation in such networks.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

It is rather common for a device in a communication network, such as a computer network, to want to know the "distance" to another device, usually to determine if the other device is in the proximity.

One way of measuring distance is to use Round Trip Time (RTT) measures. The device sends a message, requesting the other device respond directly, and starts a timer that runs until a response is received from the other device. The time is known as the Return Trip Time. Often, the RTT is calculated as an average over several measurements.

WO 99/059304 presents another way of measuring distance through the use of Time-To-Live (TTL) in messages. The sender includes an initial TTL value in a message. Each node, also known as router, that forwards the message decrements the current TTL value. When the value reaches zero, the message will not be forwarded any more. While this way does not enable direct measurement of the distance counted as a number of "jumps" or "forwardings", it is possible for the sender to request to recipient to return the TTL value in the received message. Naturally, if the recipient is too far away, it will normally not receive the message at all. A typical initial TTL value (usually called "TTL ceiling") is three.

A problem with TTL is that the TTL value is not secure: it is easy to increase the TTL value so that the message may be sent further than intended. In addition, the recipient may then simply respond that the TTL value of the received message is 3, 2, 1, or 0. The sender will then assume that the recipient is within the required distance.

A basic solution to the problem would be to cryptographically sign the TTL value in the message so that it cannot easily be changed to a higher value. This would, however, require that all (or, at the very least, most of) the nodes in the network support the signing of the TTL values, which is not always practicable.

The present invention attempts to remedy at least some of the concerns connected with Time-To-Live in the prior art, by providing a method for distance calculations using Time-To-Live, which increases the security of the calculations.

SUMMARY OF THE INVENTION

In a first aspect, the invention is directed to a method of calculating distance in a communication network. A first device selects a non-predictable Time-To-Live (TTL) value (TTL_S) and sends a message having the selected TTL value (TTL_S) to a second device. The first device then receives from the second device a message comprising a TTL value (TTL_R) of the message as received by the second device. The first device then calculates the distance to the second device by comparing the selected TTL value (TTL_S) and the TTL value (TTL_R) received from the second device.

In a preferred embodiment, the distance is calculated by subtracting the TTL value (TTL_R) received from the second device from the selected TTL value (TTL_S).

In a further preferred embodiment, the message received from the second device is protected. It is advantageous that the first device establishes a Secure Authenticated Channel with the second device, and that the protected message is protected by reception over the Secure Authenticated Channel.

In another preferred embodiment, the message received from the second device further comprises an initial TTL value (TTL'_S) of the received message. The first device reads the TTL value (TTL'_R) of the received message and compares the initial TTL value (TTL'_S) of the received message and the TTL value (TTL'_R) of the received message.

In yet another preferred embodiment, the first device measures the Round Trip Time (RTT) between the sending of the message to the second device and the reception of the message from the second device. The first device also receives from the second device authentication data that is cryptographically linked to the second device and at least the TTL value (TTL_R) of the message received by the second device; and verifies the authentication data.

In a second aspect, the invention is directed to a method of calculating distance in a communication network. A second device receives from a first device a first message having a Time-To-Live (TTL) value (TTL_R), and a second message that comprises a value based on an initial TTL value (TTL_S) of the first message. The second device then calculates the distance to the first device by comparing the value of the second message and the TTL value (TTL_R) of the first message.

In a preferred embodiment, the second message is protected.

In a third aspect, the invention is directed to a first device adapted to calculate distance to a second device in a communication network. The first device comprises a processor adapted to select a non-predictable Time-To-Live value (TTL_S); and a communication unit adapted to send a message to the second device, the message having the selected TTL value (TTL_S), and to receive a message from the second device, the message comprising a TTL value (TTL_R) of the message received by the second device. The processor is further adapted to calculate the distance to the second device by comparing the selected TTL value (TTL_S) and the TTL value (TTL_R) received from the second device.

In a preferred embodiment, the processor is further adapted to establish a secure channel over which the message from the second device is received.

In a fourth aspect, the invention is directed to a second device adapted to calculate distance in a communication network. The second device comprises a communication unit adapted to receive from a first device a first message having a Time-To-Live (TTL) value (TTL_R), and a second message comprising a value based on an initial TTL value (TTL_S) of the first message. The second device further comprises a processor adapted to calculate the distance to the first device by comparing the value based on the initial TTL value (TTL_S) and the TTL value (TTL_R) of the first message.

In a preferred embodiment, the processor is further adapted to establish a secure channel over which the second message from the first device is received.

In a fifth aspect, the invention is directed to a first device adapted to partake in the method for calculating distance in a communication network of the second aspect of the invention. The first device comprises a processor adapted to select a non-predictable Time-To-Live (TTL) value (TTL_S); and a communication unit adapted to send to the second device a first message having the selected TTL value (TTL_S), and a second message comprising the selected TTL value (TTL_S).

In a preferred embodiment, the processor is further adapted to establish a secure channel over which the second message is sent to the second device.

BRIEF DESCRIPTION OF THE DRAWINGS

The various features and advantages of the present invention and its preferred embodiments will now be described with reference to the accompanying drawings which are intended to illustrate and not to limit the scope of the present invention and in which.

DETAILED DESCRIPTION OF PREFERRED EMBODIMENTS

Figure 1:
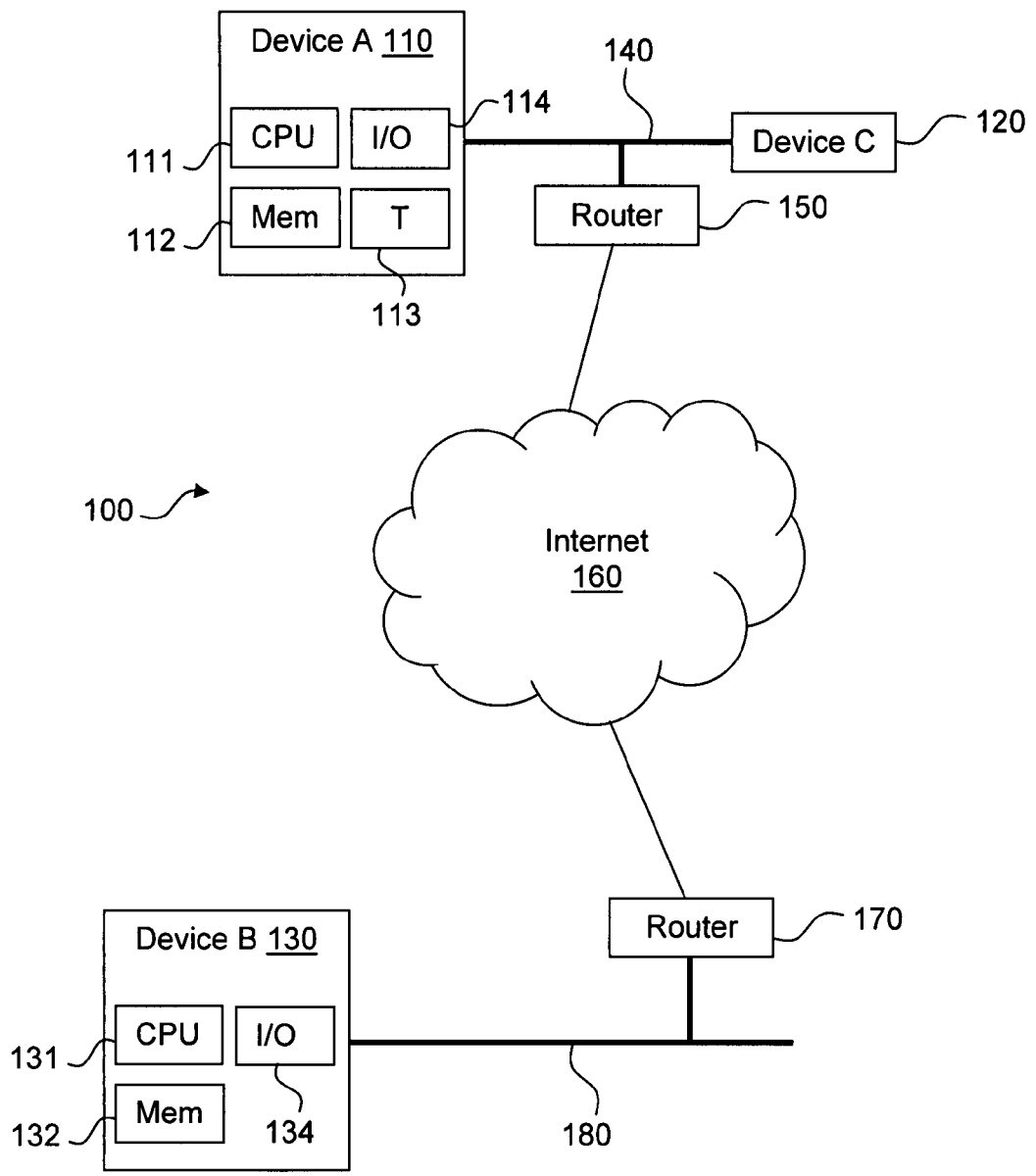
FIG. 1 illustrates an exemplary environment in which the invention is used.

FIG. 1 illustrates an exemplary network 100 in which the invention is used.

The environment 100 comprises three devices: device A 110, device B 130, and device C 120. Device A and device C are connected to a first Local Area Network (LAN) 140 that also comprises a first router 150. The first router 150 is connected to the Internet 160. Device B is connected to a second LAN 180 that further comprises a second router 170 connected to the Internet 160.

Although shown only for device A and device B, all devices preferably comprise a processor (CPU) 111, 131, a memory (Mem) 112, 132, and a communication unit (I/O) 114, 134. Device A may further comprise a timer (T) 113 or other means for measuring time for use in the embodiment described with reference to FIG. 5.

When device A sends a message to device C it is delivered directly over the first LAN 140. However, when device A sends a message to device B, the message is first broadcast over the first LAN 140. The first router 150 sees that the recipient is not connected to the first LAN 140 and therefore sends the message over the Internet 160, possibly via a number of further routers (not shown), until it arrives at the second router 170 that sends the message over the second LAN 180 where it is received by device B. The person skilled in the art will appreciate that the description of message routing is only an example and that other variants are possible, for example in which the first router 150 takes part in the transmission of a message from device A to device B.

In terms of distance counted in "jumps", the distance between device A and device C is zero; there is no need for the first router 150 to forward the message. The distance between device A and device B, however, depends on the number of intermediary routers, as each router equals a "jump". If a message may be delivered directly from the first router 150 to the second router 170, then the distance between the two devices is 2 (the first router forwards the message, as does the second router, for a total of two forwardings or jumps). Analogously, if the first router 150 may deliver the message directly to device B on the second LAN 180, then the distance is 1; if there is one further router between the first router 150 and the second router 170, then the distance is 3, and so on.

As mentioned hereinbefore, it may not be sufficiently secure to use prior art Time-To-Live (TTL) values to make sure that a message does not reach a device that is further away than intended. Hence, prior art TTL may not be used to securely calculate the distance from one device to another device.

To overcome the problems of the prior art, the present invention uses a non-predictable initial TTL value, a restraint being that it should be equal to or greater than the maximum distance that the first device considers as "close" or "in the proximity", i.e. the initial value should be greater than the TTL ceiling (TTL_C). If, for example, device A wants to verify that device B is not further away than 3 jumps, the initial TTL value set by device A must be at least 3. A further restraint is that the initial TTL value cannot be greater than the highest possible value. As one byte is given to the TTL value, the greatest possible value is 255.

It should be noted that with regards to the present invention, a "non-predictable" TTL value is not possible to detect by for example a hacker. A non-predictable value may be random or quasi-random.

In the Figures, data comprised in a message is denoted within parenthesis, while the TTL value of a message, i.e. the TTL value used by e.g. routers, is denoted outside any parenthesis.

Figure 2:
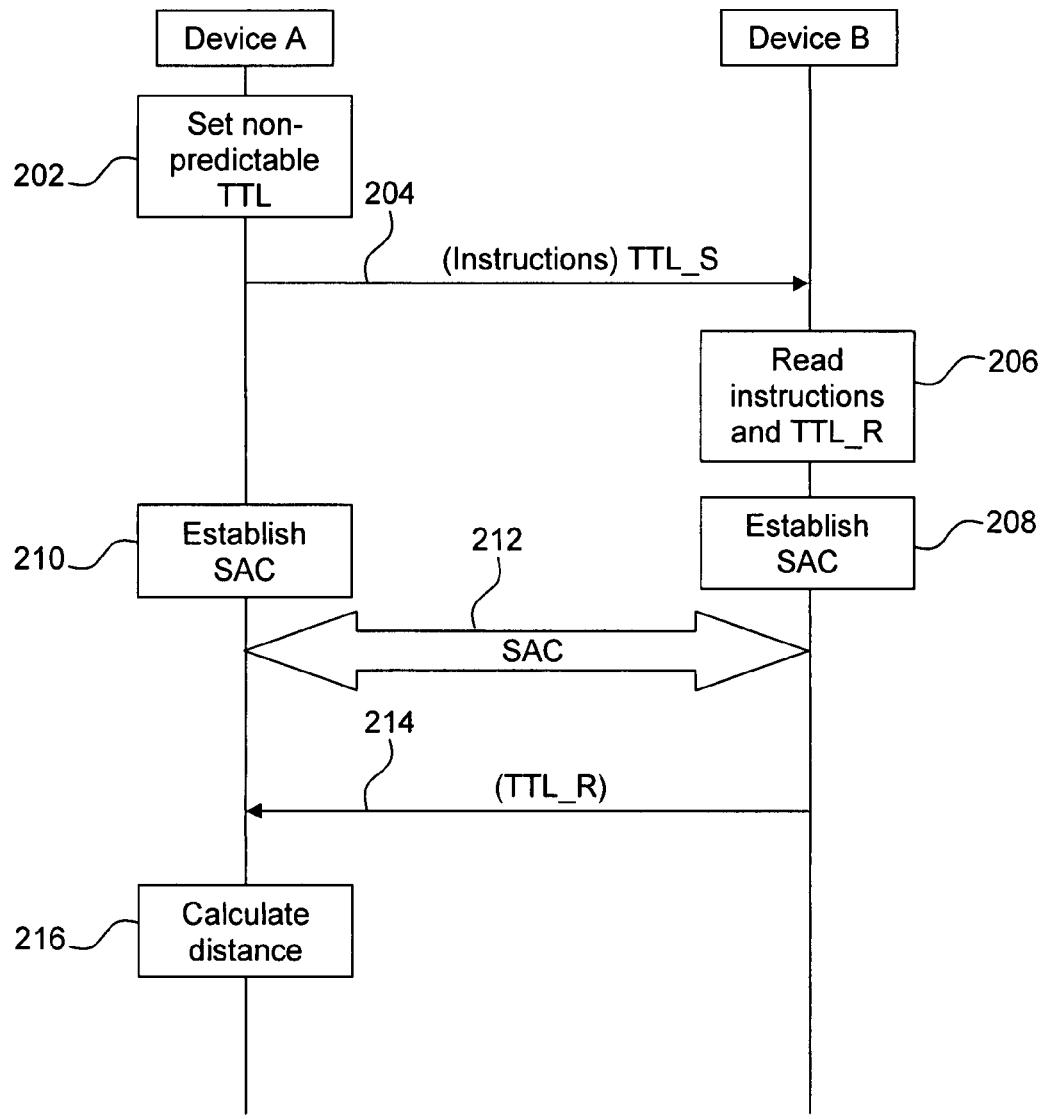
FIG. 2 illustrates a preferred embodiment of a method for distance calculation using TTL values according to the invention.

FIG. 2 illustrates a preferred embodiment of a method for distance calculation using TTL values according to the invention. Device A first sets a non-predictable TTL value 202 to a message intended for device B and sends the message 204 towards device B and preferably stores the TTL value 202 in the memory 112. The message 204 comprises instructions (Instructions) to return the received TTL value to device A. The message passes through a number of routers on its way to device B (not shown). Upon reception of the message 204, device B reads 206 the instructions and the TTL value in the received message (TTL_R). Device B and device A then establish 208, 210 a Secure Authenticated Channel (SAC) 212. In the preferred embodiment, the SAC is established by the processors 111, 131 according to the method described in US published patent application 2006/0093138 A1, but the skilled person will appreciate that other SACs or other ways of protecting messages in the art may also be used. Any action or actions that a device performs in order to protect a message, whether it is for example by establishing a SAC or by decrypting a message with a private key of an asymmetric encryption algorithm, will, where applicable, be denoted "establishing a secure channel" in the present description.

Device B then sends a message 214 with the received TTL value (TTL_R) over the SAC 212. In the description of the embodiments, sending a value over the SAC means that the value is authenticated (e.g. using a Hashed Message Authentication Code, HMAC, function), encrypted (e.g. using Advanced Encryption Standard, AES), or preferably authenticated and encrypted. The value, TTL_R, can thus not be modified by an attacker without device A noticing it. The person skilled in the art will appreciate that other means of ensuring that a modification to a value does not pass unnoticed by device A may also be used, in other words of ensuring that values are securely sent and received (i.e. the messages and values are protected). Upon reception of this TTL value (TTL_R), device A then calculates 216 the distance to device B.

If TTL_R>TTL_S, device A may conclude that an attack has been made.

If TTL_R<TTL_S−TTL_C, then device A may conclude that device B is too far away, i.e. not "near" or "in the proximity".

If TTL_S−TTL_C≦TTL_R≦TTL_S, then device A may conclude that device B a priori is within the maximum allowed distance, i.e. that device B is "near".

An example will now describe this further. Assume that device A sets the TTL ceiling (TTL_C) to 3, i.e. it considers devices no more than three jumps away to be "near". Assume further that the non-predictable TTL value set by device A in its message is 61, i.e. TTL_S=61.

If TTL_R>61, then an attack (or an error) has occurred.
If TTL_R<61−3=58, then device B is not "near".
However, if 58≦TTL_R≦61, then device A considers that device B a priori is close, i.e. within the required distance.

It should be noted that reaction to the result of the calculation 216 depends on the application. The application may for example abort further communication with the second device, continue even though it deems the second device to be out of the proximity, or check the distance again.

Figure 3:
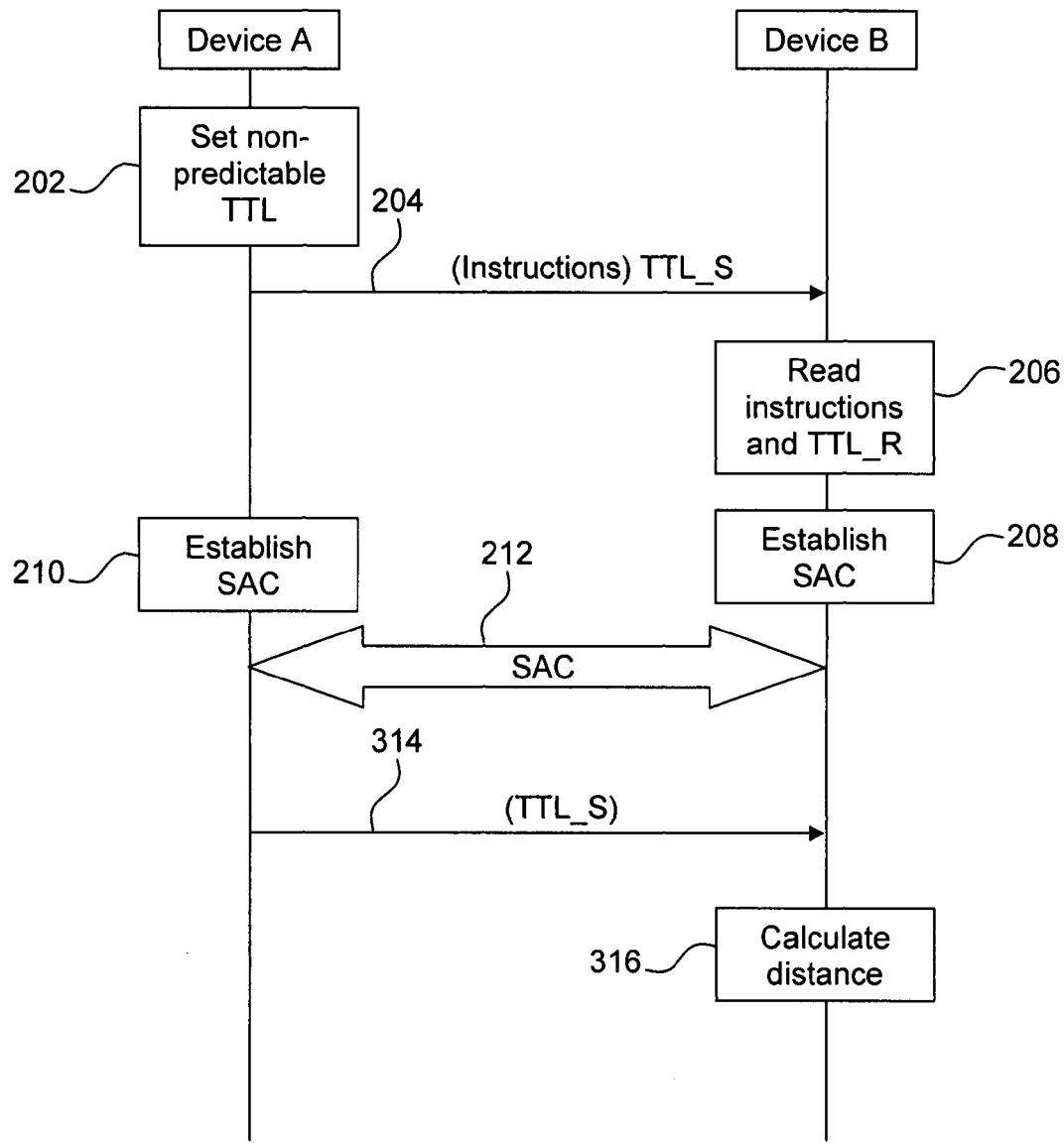
FIG. 3 illustrates an alternative embodiment of a method for distance calculation using TTL values according to the invention.

FIG. 3 illustrates an alternative embodiment of a method for distance calculation using TTL values according to the invention. The method follows the steps of the method according to the preferred embodiment until the SAC 212 has been established. However, then it is device A that sends a message 314 to device B. This message 314 may comprise the initial TTL value (TTL_S), the initial TTL value minus the TTL ceiling (TTL_S−TTL_C), both of these values, or one of these values together with the TTL ceiling (TTL_C). It is important that these values are both encrypted and authenticated when transmitted over the SAC 212.

Device B may then calculate 316 the distance by comparing the received TTL value (TTL_R) with the one or more values received in message 314, e.g. the initial TTL value (TTL_S) and use these values together with a known TTL ceiling (stored in the memory 132) to calculate mutatis mutandis the distance as described hereinbefore with reference to FIG. 2.

Figure 4:
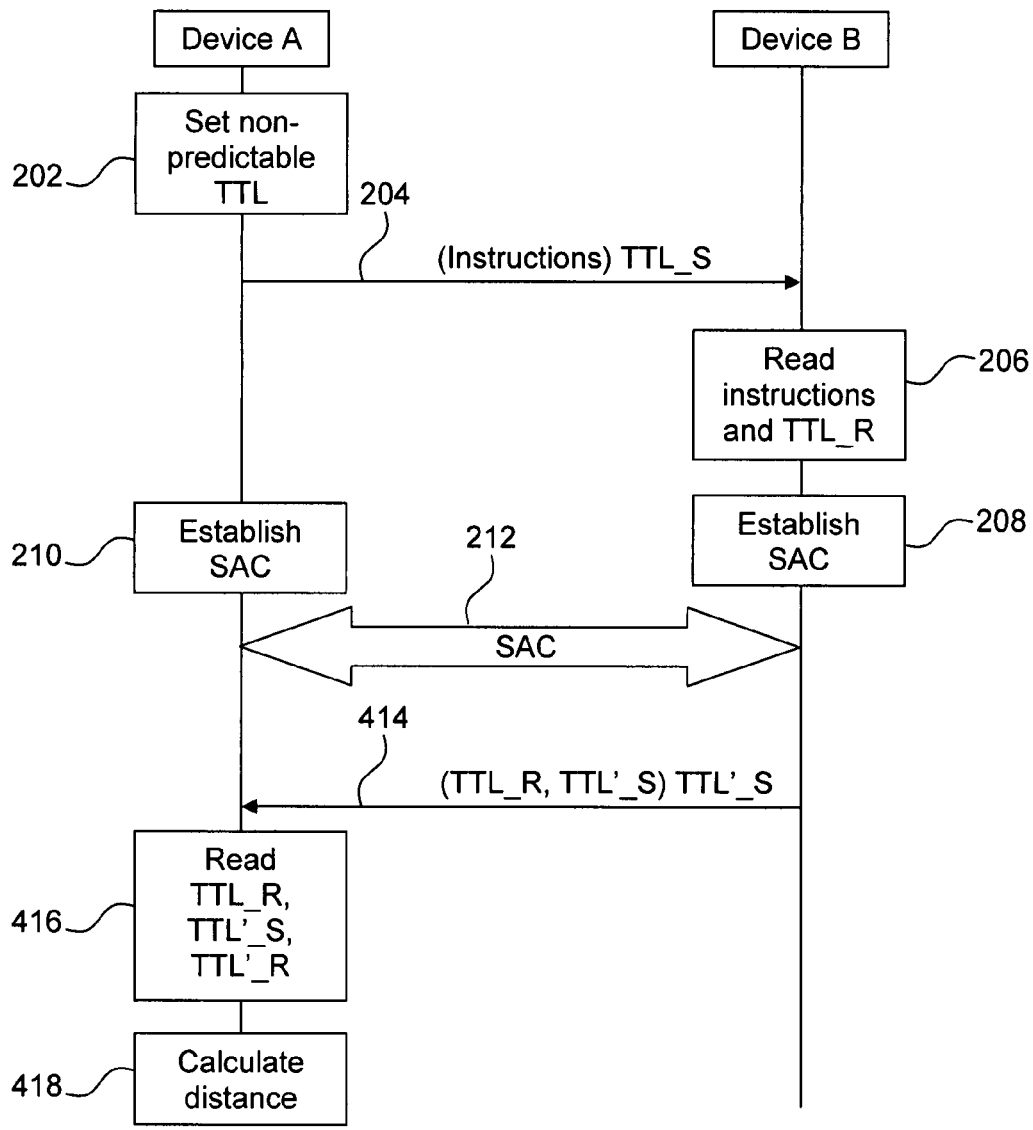
FIG. 4 illustrates a further alternative embodiment of a method for distance calculation using TTL values according to the invention.

FIG. 4 illustrates a further alternative embodiment of a method for distance calculation using TTL values according to the invention. The method follows the steps of the method according to the preferred embodiment until the SAC 212 has been established. Device B then sends a message 414 with a non-predictable initial TTL value (TTL'_S) over the SAC 212. The encrypted and authenticated message 414 comprises the TTL value received by device B (TTL_R) and the initial TTL value of message 414 (TTL'_S).

Upon reception of the message 414, device A reads the TTL value (TTL'_R) of the received message 414. Device A may then calculate 416 the distance to device B by performing the calculation, described hereinbefore with reference to FIG. 2, twice by first comparing the TTL values related to the first message 204 (TTL_S and TTL_R) and then comparing the TTL values related to the second message 414 (TTL'_S and TTL'_R).

Figure 5:
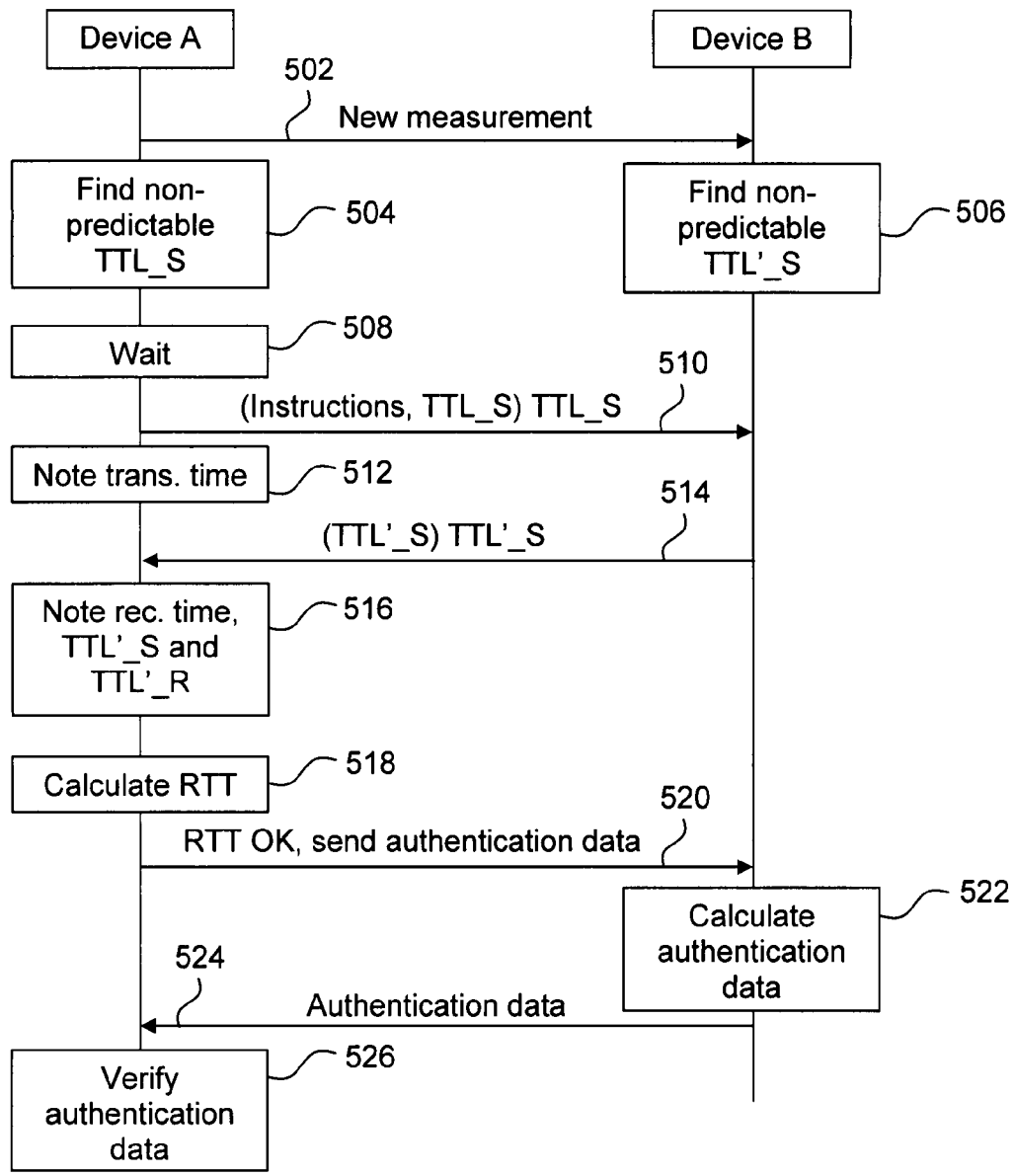
FIG. 5 illustrates yet another alternative embodiment of a method for distance calculation using TTL values according to the invention.

FIG. 5 illustrates yet another alternative embodiment of a method for distance calculation using TTL values according to the invention. A simplified description of the method is that it is a combination of a method as described hereinbefore with a method described in PCT patent application EP/2006/005319 that describes a secure method of calculating Return Trip Time (RTT) from one device to another device.

Device A first sends a message 502 to device B to let the latter know that a new distance measurement will be performed shortly and that device B therefore should prepare for it. Device A then selects 504 a non-predictable TTL value (TTL'_S) and preferably waits 508 a short while to let device B prepare, if necessary. During this time, device B selects another non-predictable TTL value (TTL_S).

Device A then sends to device B a message 510 comprising instructions and the selected TTL value (TTL_S), the message 510 itself having the selected TTL value (TTL_S). Device A also notes 512 the time of transmission, or starts the timer 113.

Upon reception of the message 510, device B, preferably immediately, responds with a message 514 comprising the TTL value selected by device B (TTL'_S), the message 514 having that TTL value (TTL'_S).

Upon reception of this return message 514, device A notes 516 the time of reception (or stops the timer 113), notes the initial TTL value of the received message 514 (TTL'_S) and the TTL value of the received message 514 (TTL'_R), and calculates 518 the return trip time (RTT). In a preferred variant, device A sends a message 520 to device B to let it know that the RTT was below a preset threshold value.

Upon reception of this message 520, device B then calculates 522 authentication data that will permit device A to verify that it was indeed device B that performed the other half of the method. In a preferred variant, message 520 comprises the X.509 certificate of device B, and TTL_S, TTL_R, TTL'_S, preferably encrypted and the whole message signed.

The person skilled in the art will appreciate that there are many possible variants. For example, device A may include another non-predictable value in message 510, while setting the non-predictable TTL value to the message itself; device B may calculate the authentication data based on other data, such as only the TTL'_S and TTL_R.

Using the embodiment in FIG. 5, device A may verify both Round Trip Time and the distance based on TTL values.

It should be noted that it is possible to increase the security of the method according to any of the embodiments described hereinbefore by iteration, i.e. performing the method a plurality of times for the same recipient.

It can thus be appreciated that the present invention improves upon the prior art by providing a secure way calculating a distance between a first device and a second device using a message with a Time-To-Live value. The person skilled in the art will appreciate that the method does not make any assumptions and does not have any special requirements on intermediate nodes that thus may continue forwarding messages as previously.

The above specification, examples and drawings provide a complete description of the manufacture and use of the composition of the invention. Since many embodiments of the invention can be made without departing from the spirit and scope of the invention, the invention resides in the claims herein after appended.

Each feature disclosed in the description and (where appropriate) the claims and drawings may be provided independently or in any appropriate combination. Features may, where appropriate be implemented in hardware, software, or a combination of the two. Connections may, where applicable, be implemented as wireless connections or wired, not necessarily direct or dedicated, connections.

Reference herein to "one embodiment" or "an embodiment", means that a particular feature, structure, or characteristic described in connection with the embodiment can be included in at least one implementation of the invention. Any appearances of the phrase "in one embodiment" in various places in the specification are not necessarily all referring to the same embodiment, nor are separate or alternative embodiments necessarily mutually exclusive of other embodiments.

Reference numerals appearing in the claims are by way of illustration only and shall have no limiting effect on the scope of the claims.

The invention claimed is:

1. A method of calculating distance in a communication network comprising a first device and a second device, the method comprising at the first device the steps of:
    selecting a non-predictable Time-To-Live (TTL) value;
    sending a message to the second device, the message having a TTL value that is liable to be decremented as the message is forwarded and that initially is set to the selected TTL value;
    receiving from the second device the TTL value of the message as received by the second device; and
    calculating the distance to the second device by comparing the selected TTL value and the TTL value received from the second device.

2. The method of claim 1, wherein the distance is calculated by subtracting the TTL value received from the second device from the selected TTL value.

3. The method of claim 1, wherein the TTL value of the message as received by the second device is protected.

4. The method of claim 3, further comprising the step of establishing a Secure Authenticated Channel with the second device, and in which the protected TTL value of the message as received by the second device is protected by reception over the Secure Authenticated Channel.

5. The method of claim 1, wherein the TTL value of the message as received by the second device is received from the second device together with an initial TTL value in a second message to which the second message TTL value was set to the initial TTL value, the second message TTL having been decremented as the second message was forwarded, the method further comprising the step of reading the second message TTL value of the second message, and wherein the calculating step further comprises comparing the initial TTL value of the second message and the second message TTL value.

6. The method of claim 1, further comprising the steps of:
    measuring the Round Trip Time between the sending of the message to the second device and the reception of the TTL value of the message as received by the second device;
    receiving authentication data from the second device, the authentication data being cryptographically linked to the second device and at least the TTL value of the message received by the second device; and
    verifying the authentication data.

7. A method of calculating distance in a communication network, the method comprising at a second device the steps of:
    receiving a first message from a first device, the first message having a Time-To-Live (TTL) value having been decremented as the message was forwarded;
    separately receiving from the first device a value based on an initial TTL value of the first message; and
    calculating the distance to the first device by comparing the value based on the initial TTL value and the TTL value of the first message.

8. The method of claim 7, wherein the value based on the initial TTL value of the first message is protected.

9. A first device for calculating distance to a second device in a communication network, the first device comprising:
    a processor for selecting a non-predictable Time-To-Live (TTL) value; and
    a communication unit for
        sending a message to the second device, the message having a TTL value that is liable to be decremented as the message is forwarded and that is initially set to the selected TTL value;
        receiving from the second device a TTL value of the message received by the second device;
    wherein the processor further calculates the distance to the second device by comparing the selected TTL value and the TTL value received from the second device.

10. The first device of claim 9, wherein the processor further establishes a secure channel over which the TTL value of the message received by the second device is received.

11. A second device adapted to calculate distance in a communication network, the second device comprising:
    a communication unit for:
        receiving a first message from a first device, the first message having a Time-To-Live (TTL) value having been decremented as the message was forwarded; and
        receiving from the first device a value based on an initial TTL value of the first message; and
    a processor for calculating the distance to the first device by comparing the value based on the initial TTL value and the TTL value of the first message.

12. The second device of claim 11, wherein the processor establishes a secure channel over which the second message from the first device value based on an initial TTL value of the first message is received.

13. A first device for taking part in the method for calculating distance in a communication network of claim 7, the first device comprising:
    a processor adapted to select a non-predictable Time-To-Live (TTL) value; and
    a communication unit for:
        sending a first message to the second device, the message having a TTL value that is liable to be decremented as the message is forwarded and that is initially set to the selected TTL value; and
        separately sending a second message comprising a value based on the selected TTL value to the second device.

14. The first device of claim 13, wherein the processor is further for establishing a secure channel over which the selected TTL value is sent to the second device.

15. The method of claim 7, wherein the selected TTL value is sent together with at least one of the TTL value initially set to of the first message and the TTL value initially set to of the first message minus a maximum distance value.

16. The method of claim 15, wherein the selected TTL value is sent together with the maximum distance value.

17. The first device of claim 13, wherein the selected TTL value is sent together with at least one of the TTL value initially set to the first message and the TTL value initially set to of the first message minus a maximum distance value.

18. The first device of claim 17, wherein the selected TTL value is sent together with the maximum distance value.

19. The method of claim 1, wherein the distance is calculated as a number of jumps.

20. The method of claim 7, wherein the distance is calculated as a number of jumps.

21. The first device of claim 9, wherein the distance is calculated as a number of jumps.

22. The second device of claim 11, wherein the distance is calculated as a number of jumps.

23. The method of claim 1, wherein the non-predictable TTL value is random or quasi-random.

24. The first device of claim 9, wherein the non-predictable TTL value is random or quasi-random.

25. The first device of claim 13, wherein the non-predictable TTL value is random or quasi-random.

* * * * *